US009565518B2

(12) United States Patent
Terrazas

(10) Patent No.: US 9,565,518 B2
(45) Date of Patent: Feb. 7, 2017

(54) EMERGENCY RESPONSE SYSTEM OPERATED ON A BLUETOOTH LOW ENERGY NETWORK

(71) Applicant: BRAINITCH SOLUTIONS, LLC, Los Angeles, CA (US)

(72) Inventor: Todd Terrazas, S. Pasadena, CA (US)

(73) Assignee: BRAINITCH SOLUTIONS, LLC, Los Angeles, CA (US)

(*) Notice: Subject to any disclaimer, the term of this patent is extended or adjusted under 35 U.S.C. 154(b) by 116 days.

(21) Appl. No.: 14/446,186

(22) Filed: Jul. 29, 2014

(65) Prior Publication Data

US 2015/0289088 A1 Oct. 8, 2015

Related U.S. Application Data

(60) Provisional application No. 61/975,611, filed on Apr. 4, 2014.

(51) Int. Cl.
*H04M 11/04* (2006.01)
*H04W 4/02* (2009.01)
(Continued)

(52) U.S. Cl.
CPC .............. *H04W 4/02* (2013.01); *G08B 25/009* (2013.01); *G08B 25/016* (2013.01);
(Continued)

(58) Field of Classification Search
CPC ........ H04W 4/008; H04W 4/02; H04W 84/18; H04W 4/028; H04W 24/10; H04W 4/22; H04M 11/04; H04M 3/5116; G08B 25/016; G08B 25/009
See application file for complete search history.

(56) References Cited

U.S. PATENT DOCUMENTS

2001/0055950 A1 12/2001 Davies et al.
2001/0055988 A1 12/2001 Blake et al.
(Continued)

FOREIGN PATENT DOCUMENTS

WO  WO 2013/054144 A1  4/2013

OTHER PUBLICATIONS

International Search Report and Written Opinion for PCT application No. PCT/US2014/048956, dated Sep. 30, 2014, 11pp.
(Continued)

*Primary Examiner* — Ajit Patel
(74) *Attorney, Agent, or Firm* — Lewis Roca Rothgerber Christie LLP

(57) ABSTRACT

A method of emergency response on a network of Bluetooth low energy (BLE) beacons includes: broadcasting corresponding identification information from each of at least three of the BLE beacons over the BLE network; and receiving a distress message at one of the BLE beacons over the BLE network from a user device that received the broadcasted corresponding identification information from the at least three of the BLE beacons. The method may further include installing the network of the BLE beacons at corresponding dispersed locations over a venue to provide an emergency response network for the venue. The network of BLE beacons may include a master BLE beacon, the method further including retransmitting the distress message by one or more of the BLE beacons over the BLE network until the master BLE beacon receives the distress message, and alerting an emergency response provider by the master BLE beacon.

13 Claims, 7 Drawing Sheets

(51) Int. Cl.

| | | |
|---|---|---|
| *H04W 24/10* | (2009.01) | |
| *G08B 25/00* | (2006.01) | |
| *G08B 25/01* | (2006.01) | |
| *H04M 3/51* | (2006.01) | |
| *H04W 4/22* | (2009.01) | |
| *H04W 84/18* | (2009.01) | |

(52) U.S. Cl.
CPC .......... *H04M 3/5116* (2013.01); *H04M 11/04* (2013.01); *H04W 4/028* (2013.01); *H04W 4/22* (2013.01); *H04W 24/10* (2013.01); *H04W 84/18* (2013.01)

(56) References Cited

U.S. PATENT DOCUMENTS

| | | |
|---|---|---|
| 2002/0016165 A1 | 2/2002 | Davies et al. |
| 2002/0034946 A1 | 3/2002 | Davies et al. |
| 2002/0037700 A1 | 3/2002 | Dooley et al. |
| 2006/0039450 A1 | 2/2006 | Fulton et al. |
| 2010/0279647 A1 | 11/2010 | Jacobs et al. |
| 2011/0063105 A1 | 3/2011 | Bennett et al. |
| 2013/0017802 A1 | 1/2013 | Adibi et al. |
| 2013/0065584 A1 | 3/2013 | Lyon et al. |
| 2013/0217332 A1 | 8/2013 | Altman et al. |
| 2013/0225197 A1 | 8/2013 | McGregor et al. |
| 2013/0344842 A1 | 12/2013 | McDonald et al. |
| 2014/0031002 A1* | 1/2014 | Ranki .................. G01S 5/0027 455/404.2 |
| 2014/0187200 A1 | 7/2014 | Reitter et al. |
| 2015/0111524 A1* | 4/2015 | South .................. H04W 4/021 455/404.2 |
| 2015/0181548 A1 | 6/2015 | Varoglu et al. |
| 2015/0227191 A1* | 8/2015 | Pitigoi-Aron ........ A61B 5/0024 713/189 |

OTHER PUBLICATIONS

Wang, Yapeng et al., Bluetooth Positioning using RSSI and Triangulation Methods, 2013 IEEE 10th Consumer Communications and Networking Conference (CCNC), , Jan. 11, 2013, pp. 837-842, 6 pages.

* cited by examiner

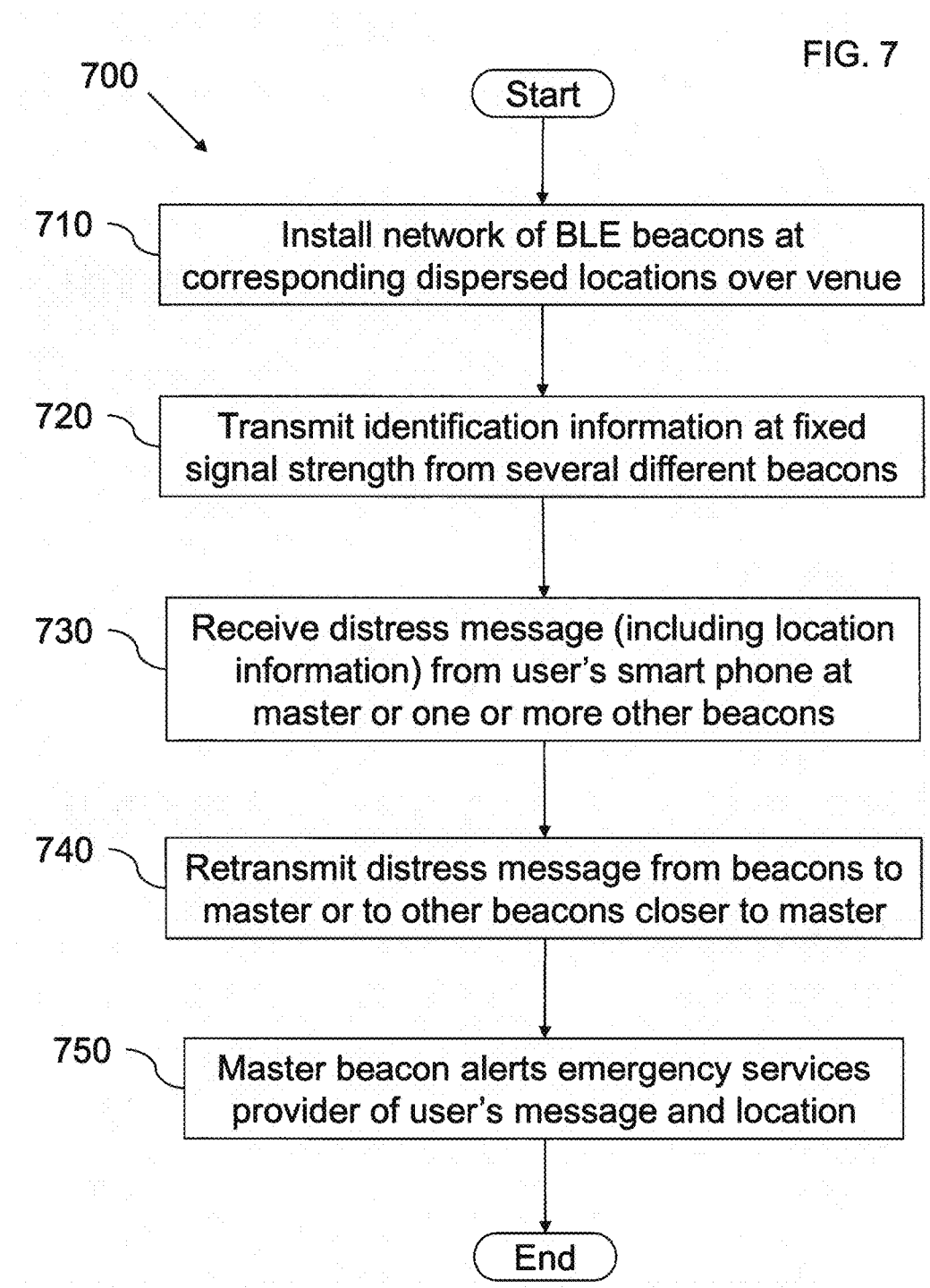

EMERGENCY RESPONSE SYSTEM OPERATED ON A BLUETOOTH LOW ENERGY NETWORK

CROSS-REFERENCE TO RELATED APPLICATIONS

This Patent Application claims the benefit of U.S. Provisional Patent Application Ser. No. 61/975,611, filed on Apr. 4, 2014 and entitled "EMERGENCY RESPONSE SYSTEM OPERATED ON A BLUETOOTH LOW ENERGY NETWORK," the entire content of which is hereby incorporated by reference.

BACKGROUND

1. Field

Aspects of embodiments of the present invention are directed toward an emergency response system operated on a Bluetooth low energy (BLE) network.

2. Description of Related Art

Portable communication devices such as cellular telephones (cell phones) provide convenient communication, such as in emergency response situations (for example, medical emergencies, fire, civil unrest such as fights or other disturbances of the peace). However, under some circumstances, such as at large gatherings (e.g., music festivals, sporting events, parades, street fairs, stadiums, universities and college campuses, casinos), a cellular network may be disabled from factors such as too much simultaneous access to the cellular network. This may create a public hazard, for example, since most people rely on being able to use their cell phones to report emergencies (such as to fire, ambulance, police, or security services providers), and emergencies are more likely to occur in crowded venues than other locations.

SUMMARY

Embodiments of the present invention are directed to an emergency response system operated on a Bluetooth low energy (BLE) network. In an example embodiment, BLE beacons are installed across an event (e.g., concert, sporting event, or other large public gathering). The beacons are configured to transmit identification information to and possibly receive emergency requests (for example, medical emergencies, civil unrest, fire) from participants or spectators at the event, such as through applications ("apps") on their smart devices (e.g., cell phones). The apps may also acquire location information of the receiving cell phone (such as through triangulation of the received identification information and corresponding signal strengths), and attach this location information to the emergency requests. The beacons may forward these requests (and possible location information) to emergency response personnel (e.g., paramedics, security staff, fire or police departments), who can then respond accordingly.

According to an embodiment of the present invention, a method of emergency response on a network of Bluetooth low energy (BLE) beacons is provided. The method includes: broadcasting corresponding identification information from each of at least three of the BLE beacons over the BLE network; and receiving a distress message at one of the BLE beacons over the BLE network from a user device that received the broadcasted corresponding identification information from the at least three of the BLE beacons.

The method may further include installing the network of the BLE beacons at corresponding dispersed locations over a venue to provide an emergency response network for the venue.

The distress message may include location information of the user device automatically generated by the user device using the received identification information of the at least three of the BLE beacons.

The broadcasting of the corresponding identification information may include broadcasting the corresponding identification information at a fixed signal strength from each of the at least three of the BLE beacons over the BLE network. The location information of the user device may be derived from triangulation of the received identification information of the at least three of the BLE beacons.

The network of BLE beacons may include a master BLE beacon. The method may further include retransmitting the distress message by one or more of the BLE beacons over the BLE network until the master BLE beacon receives the distress message.

The BLE beacons may be ordered by a proximity to the master BLE beacon. The one or more of the BLE beacons may be closer to the master BLE beacon than any of the BLE beacons from which they received the distress message over the BLE network.

The method may further include alerting an emergency response provider by the master BLE beacon when the master BLE beacon receives the distress message.

According to another embodiment of the present invention, an emergency response beacon for a Bluetooth low energy (BLE) network is provided. The beacon includes: a housing; a circuit board including a processor, memory, and a BLE transceiver configured to communicate over the BLE network; and a power source configured to supply power to the processor and the BLE transceiver. The memory has instructions stored thereon that, when executed by the processor, causes the processor to broadcast identification information through the BLE transceiver over the BLE network, and receive a distress message through the BLE transceiver over the BLE network from a user device that received the broadcasted identification information.

The distress message may include location information of the user device automatically generated by the user device using the received identification information.

The instructions, when executed by the processor, may further cause the processor to broadcast the identification information at a fixed signal strength through the BLE transceiver over the BLE network. The location information of the user device may be derived from triangulation of the received identification information of the beacon and corresponding received identification information from at least two other such beacons.

The instructions, when executed by the processor, may further cause the processor to retransmit the distress message through the BLE transceiver over the BLE network to a second such beacon.

The instructions, when executed by the processor, may further cause the processor to receive a retransmitted second such distress message through the BLE transceiver over the BLE network from a third such beacon, and retransmit the second such distress message through the BLE transceiver over the BLE network to the second such beacon.

The power source may include a battery.

According to yet another embodiment of the present invention, an emergency response system for a Bluetooth low energy (BLE) network is provided. The system includes at least three BLE beacons. Each beacon of the BLE beacons includes a processor, memory, and a BLE transceiver configured to communicate over the BLE network. The memory has instructions stored thereon that, when executed by the processor, causes the processor to broadcast corresponding identification information for the beacon through the BLE transceiver over the BLE network, and receive a distress message through the BLE transceiver over the BLE network from a user device that received the broadcasted corresponding identification information.

The distress message may include location information of the user device automatically generated by the user device using the received corresponding identification information of three or more of the BLE beacons.

The instructions, when executed by the processor, may further cause the processor to broadcast the corresponding identification information for the beacon at a fixed signal strength through the BLE transceiver over the BLE network. The location information of the user device may be derived from triangulation of the received corresponding identification information of the three or more of the BLE beacons.

The system may further include a master BLE beacon. The instructions, when executed by the processor, may further cause the processor to retransmit the distress message through the BLE transceiver over the BLE network to the master BLE beacon.

The BLE beacons may be ordered by a proximity to the master BLE beacon. The instructions, when executed by the processor, may further cause the processor to receive a retransmitted second such distress message through the BLE transceiver over the BLE network from a second beacon of the BLE beacons, retransmit the second such distress message through the BLE transceiver over the BLE network when the second beacon is further from the master BLE beacon than the beacon is from the master BLE beacon, and not retransmit the second such distress message through the BLE transceiver over the BLE network when the second beacon is closer to the master BLE beacon than the beacon is to the master BLE beacon.

The master BLE beacon may be further configured to alert an emergency response provider when the master BLE beacon receives the distress message.

Each beacon may further include a battery to supply power to the processor and the BLE transceiver.

BRIEF DESCRIPTION OF THE DRAWINGS

The accompanying drawings, together with the specification, illustrate example embodiments of the present invention. These drawings, together with the description, serve to better explain aspects and principles of the present invention.

FIG. 7 illustrates an example emergency response method according to an embodiment of the present invention.

DETAILED DESCRIPTION

Figure 1:
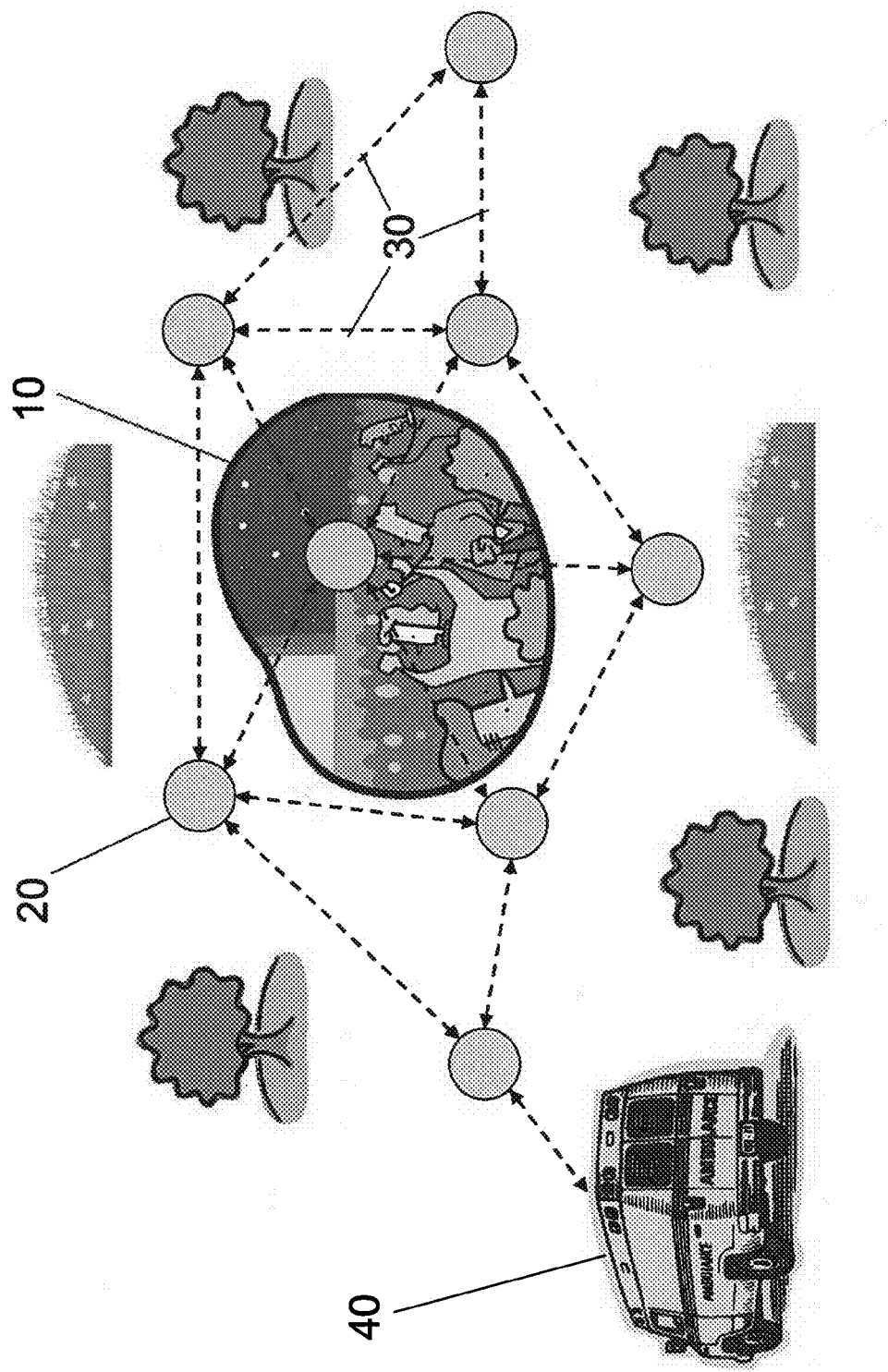
FIG. 1 illustrates an example emergency response system operated on a Bluetooth low energy (BLE) network according to an embodiment of the present invention.

Example embodiments of the present invention will now be described with reference to the accompanying drawings.

In the drawings, the same or similar reference numerals refer to the same or similar elements throughout. Herein, the use of the term "may," when describing embodiments of the present invention, refers to "one or more embodiments of the present invention." In addition, the use of alternative language, such as "or," when describing embodiments of the present invention, refers to "one or more embodiments of the present invention" for each corresponding item listed.

FIG. 1 illustrates an example emergency response system operated on a Bluetooth low energy (BLE) network according to an embodiment of the present invention.

FIG. 1 depicts a venue 10 for attracting a large number of people (such as a stadium, a music festival, a parade, a street fair, a university, or a casino). Bluetooth low energy (BLE, such as 2.4 GHz Bluetooth 4.0 Smart) beacons 20 are installed across an event taking place at the venue 10. For example, at a stadium, university, or casino, the BLE beacons 20 may be placed in more permanent locations (e.g., permanent structures, such as within buildings), while at a music festival, parade, or street fair, the BLE beacons 20 may be set up in more temporary locations (e.g., trees, utility poles).

The BLE beacons 20 may be arranged to form a network 30 (such as a mesh network) of overlapping BLE signal coverage among the beacons 20. The network 30 may provide for multiple receptions of a distress signal from different beacons 20 (to increase reliability and redundancy). In addition, the network 30 may provide for multiple overlapping transmissions of identification information from several of the BLE beacons 20, which allows for triangulation of a user's location using these multiple receptions. The beacons 20 may be small (such as the size of hand held devices), and may be placed across the venue in generally inaccessible places, such as in trees, on utility poles, in or on permanent or temporary structures such as buildings or tents.

An emergency response provider 40, such as a security service, police department, fire department, or 911 or other emergency response dispatcher, may be present and in communication with the beacons 20 over the BLE network 30. The emergency response provider 40 may monitor communications being transmitted by the beacons 20 over the network 30, and respond to the transmissions in the event of a potential emergency being transmitted over the beacons 20. For example, the beacons 20 may be programmed to receive distress signals over the BLE network 30 (say, from people's smart devices, such as cell phones) and forward these to the emergency response provider 40 over the network 30. The emergency response provider 40 may, in turn, have a smart device with an application (or "app") for receiving such distress signals (which may include location, text message, nature of distress, etc.) and displaying the location or other details on a display screen of the display device (see, for example, FIGS. 4-6). The emergency response provider 40 may also be referred to as the master BLE beacon 40, master beacon 40, or master 40.

For ease of description, embodiments herein may be described in terms of a concert venue (e.g., a music festival) with emergency medical technicians (EMT's) monitoring the distress signals, but the present invention is not limited thereto. As would be apparent to one of ordinary skill, other embodiments may be directed to other venues, such as street fairs, parades, universities, or casinos, or to other response personnel monitoring the distress signals, such as police or fire departments, and still be considered within the scope of the present invention.

Figure 2:
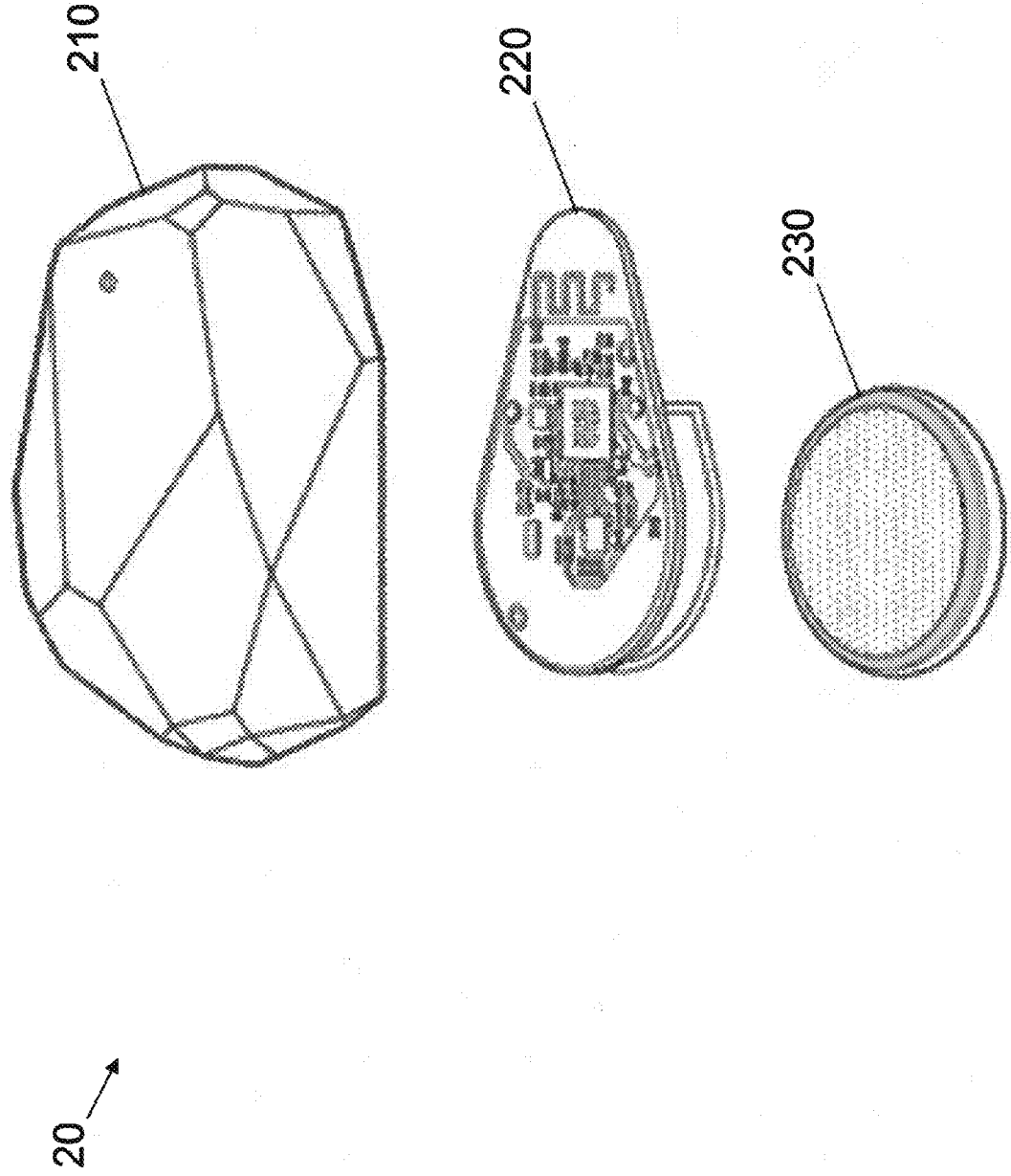
FIG. 2 is an exploded view of an example BLE beacon according to an embodiment of the present invention.
Figure 3:
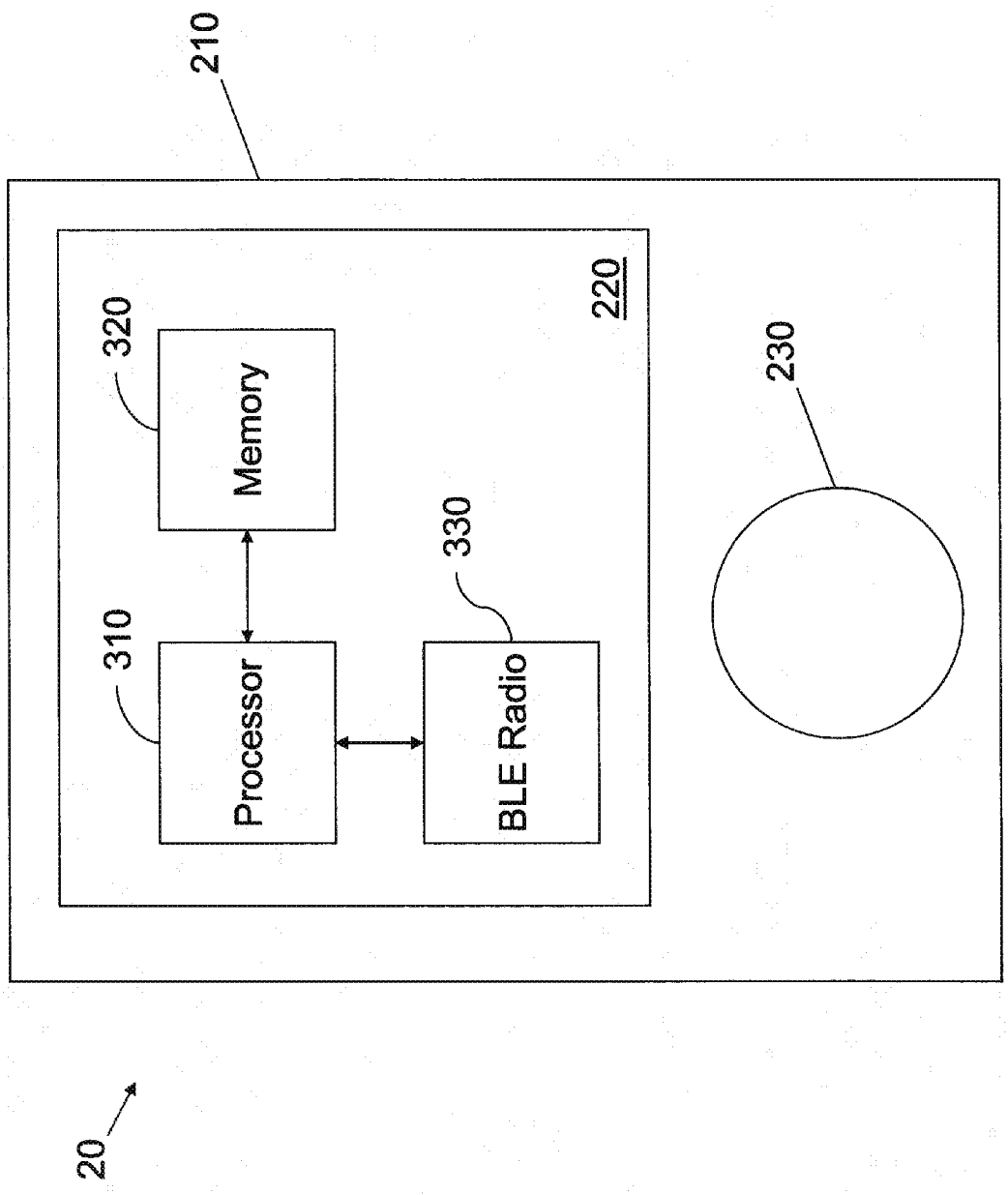
FIG. 3 is a block diagram of an example BLE beacon according to an embodiment of the present invention.

FIG. 2 is an exploded view of an example BLE beacon 20 according to an embodiment of the present invention. FIG. 3 is a block diagram of an example BLE beacon 20 according to an embodiment of the present invention.

The beacons 20 may be small devices. By way of example, the beacons 20 may be Estimote beacons (see Appendix A for further description of Estimote beacons), which are only a few inches wide in their longest dimension. Each beacon 20 may include a housing 210 for protection, a small circuit board 220 for the electronics, and a power source 230 (such as a battery). The circuit board 220 may include a processor 310, memory 320 (such as flash memory), and a BLE bi-directional radio or transceiver 330. The beacons 20 may have low power consumption from features such as the BLE transceiver 330 (which may adjust, for example, signal strength and broadcast frequency to control power consumption) and a suitable choice of processor 310.

The beacons 20 have a transmission range for their BLE transceivers 330. This range, for example, may be 230 feet in some embodiments, but may be further limited by factors such as obstacles (such as water, including human beings, who are mostly water), base signal power, etc. The beacons 20 may transmit identification information at a fixed signal strength, which allows for receiving devices to determine their distance to the transmitting beacon 20 by measuring the received signal strength of the received identification information.

As shown in FIG. 1, the beacons 20 may form a mesh network 30 of beacons 20 interconnected by the BLE transceivers 330 and their corresponding transmission signal ranges. For example, the beacons 20 may be placed 100 feet apart, so that there is sufficient overlapping coverage that each beacon 20 may send messages to or receive messages from several different nearby beacons 20 in the network 30. The beacons 20 may transmit at a particular known signal strength (such as a fixed signal strength), which allows receiving devices (such as smart phones) to determine the distance to a particular beacon 20 by the signal magnitude of the received transmission from the beacon 20. The receiving devices, for example, may "listen" for these transmitted identification information messages from the beacons 20, including estimating their received signal strengths.

For example, if a receiving device receives three such transmissions from different beacons 20, the location of the receiving device (such as the location of a person holding the device) may be determined through triangulation. That is, knowing the locations of each transmitting beacon 20, and knowing the signal strengths of received messages from the beacons 20, a person of ordinary skill may convert the signal strengths to corresponding distances, and triangulate the receiving device's location using the locations of the transmitting beacons 20 and these corresponding distances from the beacons 20. The locations of the transmitting beacons 20 may be, for example, provided as part of the transmission messages of the respective beacons 20, or provided as an electronic file to each receiving device that registers or otherwise becomes aware of the network 30 of BLE beacons 20. Using more than three such signals permits greater accuracy and reliability in determining the device's location.

The beacons 20 may be programmable. For example, the memory 320 may contain instructions that when executed by the processor 310, cause the processor 310 to perform methods described herein as would be apparent to one of ordinary skill. By way of example, through such instructions stored in the memory 320, the processor 310 may control the beacon 20 to broadcast messages over the BLE transceiver 330 and receive such messages from other beacons 20 or communication devices (such as smart devices like cell phones) trying to access the network. The processor 310 may be further programmed to relay such messages to an emergency response provider 40 (for example, by rebroadcasting such messages to other beacons 20 that are closer to the emergency response provider 40, which in turn rebroadcast the messages to the emergency response provider 40 or other, even closer, beacons 20).

The beacons 20 may be uniquely identified, such as each beacon 20 having a unique identification number that is broadcast with each outgoing message from the beacon 20. This may allow identification of the source of a broadcast message that is relayed through the network 30. By way of example, the beacon 20 may periodically broadcast a message announcing the beacon's identification number and other possible status. The broadcast may be at a particular signal strength, allowing receiving devices to estimate the range to the beacon 20 by the received signal strength. The beacons 20 may also be arranged (e.g., sorted, numbered, etc.) by a proximity to the master beacon 40. The proximity may be exact or approximate, or may correspond to a logical ordering of the beacons 20. Such an arrangement provides a way for the beacons 20 to retransmit received messages in such a fashion that the messages "move" over the network 30 away from the transmitting devices and towards the master beacon 40 based on the proximity.

In an example embodiment, the beacons 20 may monitor transmissions originating from people's smart devices (such as cell phones from attendees at an event), and relay such transmissions through the network 30 to the emergency service provider 40. For example, the emergency service provider 40 may have a beacon 20 or BLE receiver (such as a master beacon) and associated computing equipment to electronically receive the broadcast message either directly or through the network 30, the message including the originator's location (e.g., through electronic processing techniques such as triangulation on the originating device using multiple received identification messages from different transmitting beacons 20), and dispatch assistance to the location (e.g., send an electronic message to an emergency response crew, where the message may contain a location and a description of an event).

For example, an emergency medical technician (EMT) may have a smart device (such as a smart phone) running an application configured to receive such a message from the emergency service provider 40. In another embodiment, the EMT may be the emergency service provider 40 and the application may be configured to receive and process the emergency request directly from the relayed transmissions over the network 30 (or directly from the originating smart device). See, for example, FIGS. 4-6, which are screen shots of example emergency response provider applications for a smart device according to embodiments of the present invention.

FIG. 7 illustrates an example emergency response method 700 according to an embodiment of the present invention. This and other methods described herein may be wholly or partially implemented in hardware, software, firmware, or some combination thereof using an electronic computing device such as a computer processor or microprocessor and associated nonvolatile storage device (such as flash memory or a disk drive) as would be apparent to one of ordinary skill. For example, each of the steps may be performed as a series of computer instructions on a computer processor. The instructions may be stored, for example, on the nonvolatile storage device, read into an instruction storage area, such as a random access memory (RAM), and accessed from the RAM by the computer processor.

Processing begins, and in step 710, multiple BLE beacons 20 are installed in a network 30 at corresponding dispersed locations across a venue. The installation may include initializing the beacons 20, for example, assigning a unique identification to each beacon 20, assigning a location to each beacon 20, identifying a master beacon 40, connecting power to the beacons (e.g., testing, charging, or replacing batteries), etc. Accordingly, some portions of this step may be physical while other may be automated (such as being performed on the processors of the beacons 20).

In step 720, multiple beacons 20 transmit identification information (for example, location information, beacon identifier) at a fixed signal strength throughout a coverage area to any devices (such as smart phones) interested or monitoring such transmissions. In further detail, a user application (or "app") may be provided to smart devices, such as iOS or Android based smart devices, for use by attendees of an event. The app may allow the smart devices to monitor the transmissions of the beacons 20, which may provide for location determination of the smart device. For example, the app may register or otherwise identify the locations (or other identifying information) of the beacons 20 at the venue. This may allow the app to determine the location of the smart device through triangulation of three received beacon transmissions of this corresponding identification information from different beacons 20.

Figure 4:
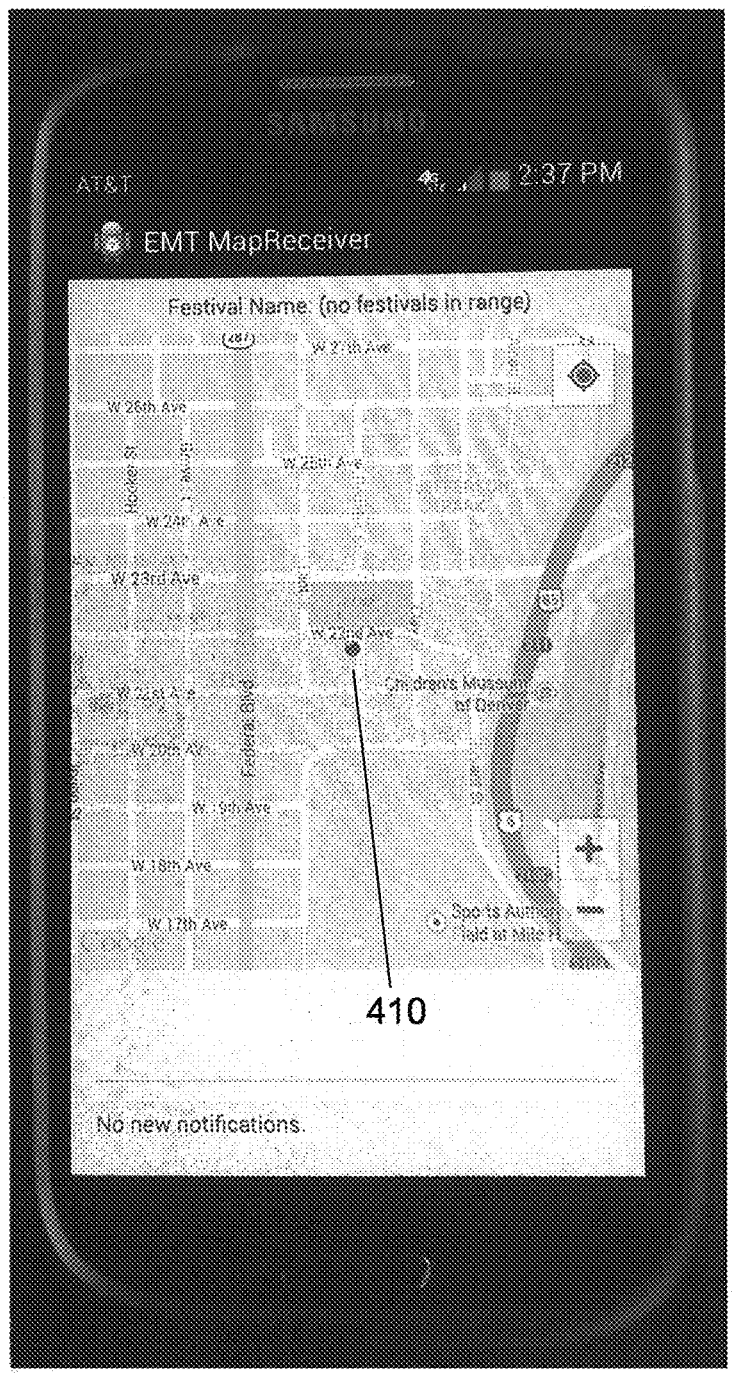
FIGS. 4-6 are screen shots of example emergency response provider applications for a smart device according to embodiments of the present invention.
Figure 5:
Figure 6:
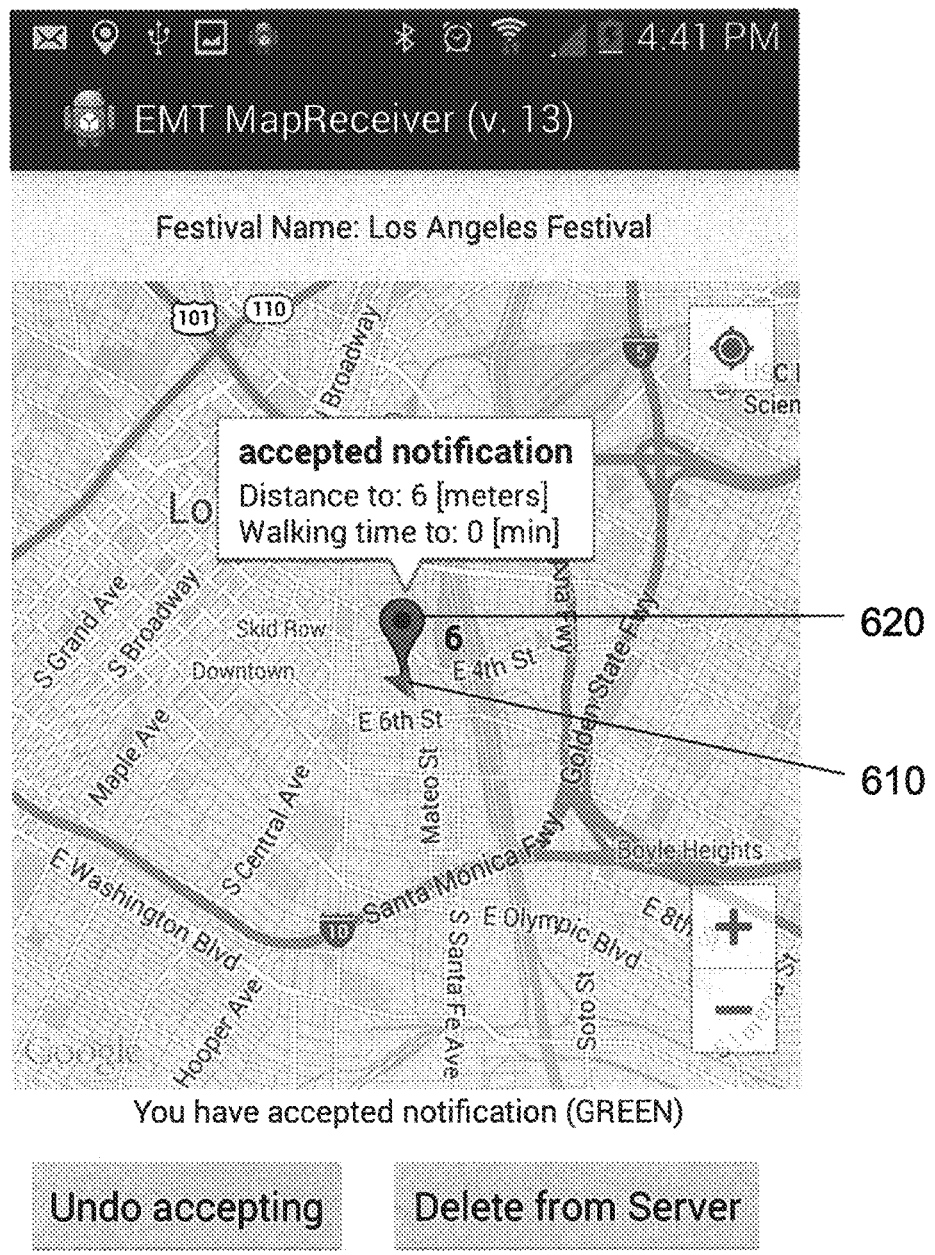

The app may also integrate a "panic" button, so when a corresponding user (such as an attendee of a crowded event) is in or near an emergency, and when normal emergency services (such as 911) are not available, local emergency service personnel, such as emergency medical technicians (EMTs) at the emergency service provider 40, may be alerted through an administrative application that receives the "panic" signal (and corresponding location of the smart device) from the user over the network 30. For example, the location of the originating "panic" signal or distress message may appear as a dot 410 (such as a blue dot) on a map displayed on a smart device used by the EMT, as illustrated in FIG. 4, or as a blue dot 510 with a red information balloon 520 for a newly received notification, as illustrated in FIG. 5, or as a blue arrow 610 with a green information balloon 620 for an accepted notification (such as a distress message that has been accepted and is currently being responded to).

The BLE beacons 20 forming the mesh network 30 act as a communication channel. For example, in step 730, as individual beacons 20 receive the "panic" signal (as a BLE transmission) from the user's smart device, they may also receive other information from the smart device, such as location information (e.g., location coordinates if the smart device determines its location from identifying transmissions of multiple beacons, or distances or signal strengths from transmissions of several beacons if the smart device does not determine its location) or a brief text message or description selection (such as from a menu) from the user. The emergency service provider 40 (or "master" or "master beacon") may also receive the message from the user if sufficiently close.

In step 740, the received information from the smart device may be packaged as an outgoing message (with possible further processing, such as location determination) from each beacon 20 in reception range, and retransmitted from the beacon 20. These retransmissions may in turn be received and retransmitted from other beacons 20 in the network 30 until the message is received by the master beacon or emergency service provider 40. As each beacon 20 carries a unique identification, as may each message, a straightforward communication protocol as known by someone of ordinary skill may be used to prevent unnecessary retransmissions of the messages (which could otherwise lead to excessive use of the network 30 to relay a single originating signal from the smart device).

For example, retransmissions of the message may take place only at beacons 20 that are "closer" (in some sense, such as physical distance or other ordering) to the master beacon 40 than the previous sending beacon 20. In another embodiment, each In step 750, the master beacon or emergency service provider 40 receives the message and, if necessary or appropriate, alerts emergency response personnel of the originator of the message together with corresponding location information. Appropriate action is then taken by the emergency response personnel.

While this monitoring and retransmissions by the beacons 20 may increase their power consumption, steps may be taken to keep this consumption acceptable. For example, in temporary venues (such as outdoor music festivals, parades, or street fairs), where the beacons 20 may only be installed temporarily, batteries 230 of the beacons 20 may be tested or charged before the event to be sure they have sufficient power to last for the duration of the event. In venues such as stadiums, universities, or casinos, where the beacons may be installed permanently (or for multiple events), more permanent power sources, such as dedicated (low) power lines may be routed to each beacon 20 (e.g., each beacon 20 may be hardwired to a power source).

In other embodiments, the smart devices themselves may also function as beacons 20. For example, iOS-based smart devices (such as iPhones running iOS7 or later) may act as iBeacons, which may be programmed to provide functionality of the above described beacons 20. Though such smart devices may not be stationary (like the above-described beacons 20), such smart devices may provide other beacon services, such as message forwarding through the network 30. This, for example, may increase the coverage or reliability of the network 30.

The above example embodiments are for descriptive purposes only, and are not meant to limit the scope of the present invention. For example, in other embodiments, other low energy networks may be used in place of, or in addition to, BLE networks. Further, embodiments of the present application may be directed to more remote locations, for example, where cellular network service does not exist, or to urban or more crowded environments (including entire cities) with cellular network service normally, but whose cellular network service is unavailable for reasons other than those discussed above (e.g., power outage, computer malfunction, natural disaster, etc.)

While the present invention has been described in connection with certain example embodiments, it is to be understood that the invention is not limited to the disclosed embodiments, but, on the contrary, is intended to cover various modifications and equivalent arrangements, as disclosed in the following claims, and equivalents thereof.

What is claimed is:

1. A method of emergency response on a network of Bluetooth low energy (BLE) beacons, the method comprising:
   broadcasting corresponding identification information from each of at least three of the BLE beacons over the BLE network;
   receiving a distress message including a location of a user device at one of the BLE beacons over the BLE network from the user device after the user device received the broadcasted corresponding identification information from the at least three of the BLE beacons and generated the location of the user device using the received corresponding identification information;
retransmitting the distress message over the BLE network to a master BLE beacon, the BLE beacons being ordered by proximity to the master BLE beacon;
receiving a retransmitted second such distress message at the one beacon over the BLE network from a second beacon of the BLE beacons;
retransmitting the second such distress message over the BLE network when the second beacon is further from the master BLE beacon than the one beacon is from the master BLE beacon; and
not retransmitting the second such distress message over the BLE network when the second beacon is closer to the master BLE beacon than the one beacon is to the master BLE beacon.

2. The method of claim 1, further comprising installing the network of the BLE beacons at corresponding dispersed locations over a venue to provide an emergency response network for the venue.

3. The method of claim 1, wherein
the broadcasting of the corresponding identification information comprises broadcasting the corresponding identification information at a fixed signal strength from each of the at least three of the BLE beacons over the BLE network, and
the location of the user device is generated by the user device through triangulation using the received corresponding identification information from the at least three of the BLE beacons.

4. The method of claim 1, further comprising retransmitting the distress message by one or more of the BLE beacons over the BLE network until the master BLE beacon receives the distress message.

5. The method of claim 4, wherein
the one or more of the BLE beacons are closer to the master BLE beacon than any of the BLE beacons from which they received the distress message over the BLE network.

6. The method of claim 4, further comprising alerting an emergency response provider by the master BLE beacon when the master BLE beacon receives the distress message.

7. An emergency response beacon for a Bluetooth low energy (BLE) network, the beacon comprising:
a housing;
a circuit board comprising:
  a processor;
  memory; and
  a BLE transceiver configured to communicate over the BLE network; and
a power source configured to supply power to the processor and the BLE transceiver,
wherein the memory has instructions stored thereon that, when executed by the processor, causes the processor to:
  broadcast identification information through the BLE transceiver over the BLE network;
  receive a distress message including a location of a user device through the BLE transceiver over the BLE network from the user device after the user device received the broadcasted identification information and generated the location of the user device using the received identification information;
  retransmit the distress message through the BLE transceiver over the BLE network to a master BLE beacon;
  receive a retransmitted second such distress message through the BLE transceiver over the BLE network from a second such beacon, the beacon and the second such beacon being ordered by proximity to the master BLE beacon;
  retransmit the second such distress message through the BLE transceiver over the BLE network when the second such beacon is further from the master BLE beacon than the beacon is from the master BLE beacon; and
  not retransmit the second such distress message through the BLE transceiver over the BLE network when the second such beacon is closer to the master BLE beacon than the beacon is to the master BLE beacon.

8. The beacon of claim 7, wherein
the instructions, when executed by the processor, further cause the processor to broadcast the identification information at a fixed signal strength through the BLE transceiver over the BLE network, and
the location of the user device is generated by the user device through triangulation using the received identification information from the beacon and corresponding received identification information from at least two other such beacons.

9. The beacon of claim 7, wherein the power source comprises a battery.

10. An emergency response system for a Bluetooth low energy (BLE) network, the system comprising:
a master BLE beacon; and
at least three BLE beacons ordered by proximity to the master BLE beacon, each beacon of the BLE beacons comprising:
  a processor;
  memory; and
  a BLE transceiver configured to communicate over the BLE network,
  wherein the memory has instructions stored thereon that, when executed by the processor, causes the processor to:
    broadcast corresponding identification information for the beacon through the BLE transceiver over the BLE network;
    receive a distress message including a location of a user device through the BLE transceiver over the BLE network from the user device after the user device received the broadcasted corresponding identification information and generated the location of the user device using the received corresponding identification information from three or more of the BLE beacons;
    retransmit the distress message through the BLE transceiver over the BLE network to the master BLE beacon;
    receive a retransmitted second such distress message through the BLE transceiver over the BLE network from a second beacon of the BLE beacons;
    retransmit the second such distress message through the BLE transceiver over the BLE network when the second beacon is further from the master BLE beacon than the beacon is from the master BLE beacon; and
    not retransmit the second such distress message through the BLE transceiver over the BLE network when the second beacon is closer to the master BLE beacon than the beacon is to the master BLE beacon.

11. The system of claim 10, wherein the instructions, when executed by the processor, further cause the processor to broadcast the corresponding identification information for the beacon at a fixed signal strength through the BLE transceiver over the BLE network, and the location of the user device is generated by the user device through triangulation using the received corresponding identification information from the three or more of the BLE beacons.

12. The system of claim 10, wherein the master BLE beacon is further configured to alert an emergency response provider when the master BLE beacon receives the distress message.

13. The system of claim 10, wherein each beacon further comprises a battery to supply power to the processor and the BLE transceiver.

* * * * *